(12) United States Patent
Araújo et al.

(10) Patent No.: US 11,163,379 B2
(45) Date of Patent: Nov. 2, 2021

(54) ILLUMINATING AN ENVIRONMENT FOR LOCALISATION

(71) Applicant: Telefonaktiebolaget LM Ericsson (publ), Stockholm (SE)

(72) Inventors: José Araújo, Stockholm (SE); Zeid Al-Husseiny, Stockholm (SE); Lars Andersson, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 161 days.

(21) Appl. No.: 16/480,422

(22) PCT Filed: Apr. 5, 2017

(86) PCT No.: PCT/EP2017/058135
§ 371 (c)(1),
(2) Date: Jul. 24, 2019

(87) PCT Pub. No.: WO2018/184675
PCT Pub. Date: Oct. 11, 2018

(65) Prior Publication Data
US 2019/0392240 A1    Dec. 26, 2019

(51) Int. Cl.
*G06F 3/03*   (2006.01)
*H04N 13/254* (2018.01)
*G06K 9/00*   (2006.01)
*G06K 9/20*   (2006.01)

(52) U.S. Cl.
CPC ....... *G06F 3/0304* (2013.01); *G06K 9/00664* (2013.01); *G06K 9/2027* (2013.01); *H04N 13/254* (2018.05)

(58) Field of Classification Search
CPC ............... G06F 3/0304; H04N 13/254; G06K 9/00664; G06K 9/2027
See application file for complete search history.

(56) References Cited

U.S. PATENT DOCUMENTS

| | | | |
|---|---|---|---|
| 8,331,637 B2* | 12/2012 | Bar-Aviv | G16H 70/60 382/128 |
| 8,620,093 B2* | 12/2013 | Nguyen | G06K 9/6249 382/218 |
| 9,407,837 B2* | 8/2016 | Lee | G06K 9/2036 |

(Continued)

OTHER PUBLICATIONS

International Search Report and Written Opinion of the International Searching Authority, PCT/EP2017/058135, dated Dec. 15, 2017, 15 pages.

(Continued)

*Primary Examiner* — Mia M Thomas
(74) *Attorney, Agent, or Firm* — Sage Patent Group

(57) ABSTRACT

It is presented a method for illuminating an environment for localisation of a user device comprising a light source and at least one camera. The method is performed in an illumination determiner. The method includes determining a need for adjusting illumination, determining a field of view of the at least one camera of the user device, and obtaining environment data for elements within the field of view from previously stored environment data. The method also includes selecting at least one key element of the elements, and adjusting illumination of at least a subset of the at least one key element by adapting a light source.

16 Claims, 4 Drawing Sheets

(56) References Cited

U.S. PATENT DOCUMENTS

| | | | |
|---|---|---|---|
| 9,526,658 B2* | 12/2016 | Dialameh | G06K 9/00671 |
| 9,958,269 B2* | 5/2018 | Metzler | G01C 15/00 |
| 10,019,838 B2* | 7/2018 | Liu | H04N 13/243 |
| 10,037,689 B2* | 7/2018 | Taylor | G06K 7/10475 |
| 10,158,845 B2* | 12/2018 | Zhu | G06T 7/521 |
| 10,194,138 B2* | 1/2019 | Zhou | H04N 13/106 |
| 10,531,074 B2* | 1/2020 | Wilson | H04N 9/045 |
| 10,957,059 B1* | 3/2021 | Katz | H04N 13/327 |
| 2006/0119572 A1* | 6/2006 | Lanier | G06F 1/1605 345/156 |
| 2012/0306850 A1* | 12/2012 | Balan | G06F 3/0304 345/419 |
| 2014/0139632 A1* | 5/2014 | Livshitz | G01S 17/50 348/46 |
| 2014/0176535 A1* | 6/2014 | Krig | G06T 19/20 345/419 |
| 2015/0229915 A1* | 8/2015 | Kirk | H04N 5/33 348/51 |
| 2016/0178991 A1* | 6/2016 | Wan | G01S 7/4972 348/169 |
| 2017/0203446 A1* | 7/2017 | Dooley | H04N 5/23206 |
| 2017/0286773 A1* | 10/2017 | Skaff | G06N 3/0454 |
| 2018/0085927 A1* | 3/2018 | Kapoor | A47L 11/24 |
| 2018/0095529 A1* | 4/2018 | Tokubo | G06F 3/012 |
| 2018/0189565 A1* | 7/2018 | Lukierski | A47L 9/009 |
| 2018/0350144 A1* | 12/2018 | Rathod | G06Q 20/3276 |
| 2018/0361583 A1* | 12/2018 | Williams | G05D 1/0274 |
| 2018/0361584 A1* | 12/2018 | Williams | G06F 16/29 |
| 2019/0246091 A1* | 8/2019 | Bikumandla | H04N 5/2259 |
| 2019/0392240 A1* | 12/2019 | Ara Jo | H04N 13/254 |
| 2020/0008024 A1* | 1/2020 | Hu | H04W 4/029 |
| 2020/0042108 A1* | 2/2020 | Wan | G06F 3/0346 |
| 2020/0364930 A1* | 11/2020 | Buys | B64D 47/08 |

OTHER PUBLICATIONS

Open Mobile Alliance, Lightweight Machine to Machine Technical Specification, Approved Version 1.0—Feb. 8, 2017, OMA-TS-LightweightM2M-V1_0-20170208-A, 138 Pages.

P. Van Der Stok et al., "Patch and Fetch Methods for Constrained Application Protocol (CoAP)", May 8, 2016, 16 Pages.

Z. Shelby et al., "The Constrained Application Protocol (CoAP)", Internet Engineering Task Force (IETF), Jun. 2014, 112 Pages.

* cited by examiner

ILLUMINATING AN ENVIRONMENT FOR LOCALISATION

This application is a 35 U.S.C. § 371 national stage application of PCT International Application No. PCT/EP2017/058135 filed on Apr. 5, 2017, the disclosure and content of which is incorporated by reference herein in its entirety.

TECHNICAL FIELD

The invention relates to a method, illumination determiners, a computer program and a computer program product for illumination of an environment for localisation of a user device.

BACKGROUND

Localisation and tracking are key components in many applications, such as self-driving cars, unmanned aerial vehicles, domestic robots, as well as for augmented reality (AR) and virtual reality (VR). Localisation is the process of determining the position of a device/object in space, whereas tracking seeks to identify the position of a device/object over time.

Localisation and tracking for commercial devices such as handheld phones, tablets and head-mounted displays (HMDs), can be performed by merging visual information from cameras and motion information from Inertial Measurement Units (IMUs). In this way, the device is able to acquire six degrees of freedom (DoF) movements of the user (orientation and translation). The process of learning an area while keeping track of a user's current position and orientation within it, is known as Simultaneous Localisation and Mapping, or SLAM.

Examples of the application of SLAM are Google Tango and the Microsoft Hololens AR HMD. Google Tango is a platform that uses computer vision to give devices (smartphones and tablets at the moment) the ability to understand their position relative to the world around them. Google has developed both a Tango-enabled tablet and a smartphone together with Lenovo, where the device has a wide-angle camera, a depth sensing camera, an IMU, and a software stack that enables motion tracking and area learning through the 3D space. Similarly, the Microsoft Hololens AR HMD, utilises four cameras and an IMU to perform SLAM.

This technology allows new applications to explore the physical space around the user, including indoor and outdoor precise navigation without GPS (Global Positioning System), e.g. inside a building. Also, this enables measurement and scanning of spaces, games that know where the user is in the room and what is around the user and autonomous robotic operations inside buildings (vacuum cleaners, drones, etc.).

The SLAM algorithm can be used for AR, where it is responsible for capturing and storing a map used for the AR applications as, e.g. placing virtual objects (e.g. a virtual TV, painting, pet, etc.) in a room and allowing these objects to virtually remain in the room so that the user can see them again when returning to the room. Moreover, the SLAM algorithm allows the AR devices to localize themselves inside a room or buildings and continuously perform six DoF tracking of the user so that the user can interact with virtual objects.

A problem with SLAM, and other camera based positioning technologies, is that tracking and mapping needs be performed in environments with appropriate light conditions.

For instance, Microsoft Hololens is unable to operate when the light conditions are insufficient since its cameras cannot be used to perform SLAM. The device then enters a limited mode where a main screen is displayed but where all virtual objects disappear.

U.S. Pat. No. 9,398,229 B2 discloses an illumination system comprising: light sources configured for selective illumination of a target within a field of view of an imaging system; optics configured for positioning to direct light that is generated by a subset of the light sources to illuminate a region within the field of view; an imaging application configured to: activate all of the light sources to illuminate the field of view and to reflect light off of the target; activate the imaging system to capture a reflection image of the target from the reflected light; determine an initial position of the target based on the captured reflection image; responsive to the determination of the initial position of the target, activate the subset of the light sources for the selective illumination of the target; and position the optics to illuminate the region within the field of view that includes the target of the selective illumination.

However, it is desired to reduce illumination needs even further. Any reduction in illumination requirements improves power efficiency and battery life.

SUMMARY

According to a first aspect, it is presented a method for illuminating an environment for localisation of a user device comprising a light source and at least one camera. The method is performed in an illumination determiner and comprises the steps of: determining a need for adjusting illumination; determining a field of view of the at least one camera of the user device; obtaining environment data for elements within the field of view from previously stored environment data; selecting at least one key element of the elements; and adjusting illumination of at least a subset of the at least one key element by adapting a light source.

The step of adjusting illumination may comprise turning on the light source.

The key elements may be of greater importance for localisation than non-key elements.

The step of selecting at least one key element may comprise ranking the elements according to importance for SLAM and selecting a number of the highest ranked elements.

The step of adjusting illumination may comprise matching the illumination with an illumination applied for the stored data of the at least a subset of the at least one key element.

The step of determining a need for light source adaptation may consider illumination from a light source of another user device.

The step of determining a need for light source adaptation may be based on receiving a signal, from another user device, indicating a required change of light situation in the field of view.

The step of determining a field of view may be based on a pose of the at least one camera of the user device.

The method may further comprise the step of: predicting movement of at least one of the user device and a key element, in which case the step of adjusting illumination is based on the predicted movement.

The step of predicting movement may comprise predicting movement of the user device to a location where light conditions are different from current light conditions; in which case the step of adjusting illumination comprises gradually adjusting intensity of the light source.

The method may further comprise the step of: determining, for each key element, whether a level of illumination of the key element needs to be adjusted: in which case the step of adjusting illumination may comprise only adjusting the illumination for any key element for which illumination needs to be adjusted.

The step of adjusting illumination may comprise directing the light source.

The method may further comprise the steps of: inactivating illumination once the user device has been positioned; and entering a sleep state for a sleep period before the method is repeated.

According to a second aspect, it is presented an illumination determiner for illuminating an environment for localisation of a user device comprising a light source and at least one camera. The illumination determiner comprises: a processor; and a memory storing instructions that, when executed by the processor, cause the illumination determiner to: determine a need for adjusting illumination; determine a field of view of the at least one camera of the user device; obtain environment data for elements within the field of view from previously stored environment data; select at least one key element of the elements; and adjust illumination of at least a subset of the at least one key element by adapting a light source.

The instructions to adjust illumination may comprise instructions that, when executed by the processor, cause the illumination determiner to turn on the light source.

The key elements may be of greater importance for simultaneous localisation and mapping, SLAM, than non-key elements.

The instructions to select at least one key element may comprise instructions that, when executed by the processor, cause the illumination determiner to rank the elements according to importance for SLAM and selecting a number of the highest ranked elements.

The instructions to adjust illumination may comprise instructions that, when executed by the processor, cause the illumination determiner to match the illumination with an illumination applied for the stored data of the at least a subset of the at least one key element.

The instructions to determine a need for light source adaptation may comprise instructions that, when executed by the processor, cause the illumination determiner to consider illumination from a light source of another user device.

The instructions to determine a need for light source adaptation may comprise instructions that, when executed by the processor, cause the illumination determiner to determine a need for light source adaptation based on receiving a signal, from another user device, indicating a required change of light situation in the field of view.

The instructions to determine a field of view may comprise instructions that, when executed by the processor, cause the illumination determiner to determine a field of view based on a pose of the at least one camera of the user device.

The illumination determiner may further comprise instructions that, when executed by the processor, cause the illumination determiner to: predict movement of at least one of the user device and a key element, in which case the instructions to adjust illumination comprise instructions that, when executed by the processor, cause the illumination determiner to adjust illumination based on the predicted movement.

The instructions to predict movement may comprise instructions that, when executed by the processor, cause the illumination determiner to predict movement of the user device to a location where light conditions are different from current light conditions; in which case the instructions to adjust illumination comprise instructions that, when executed by the processor, cause the illumination determiner to gradually adjust intensity of the light source.

The illumination determiner may further comprise instructions that, when executed by the processor, cause the illumination determiner to: determine, for each key element, whether a level of illumination of the key element needs to be adjusted; in which case the instructions to adjust illumination comprise instructions that, when executed by the processor, cause the illumination determiner to only adjust the illumination for any key element for which illumination needs to be adjusted.

The instructions to adjust illumination may comprise instructions that, when executed by the processor, cause the illumination determiner to direct the light source.

The illumination determiner may further comprise instructions that, when executed by the processor, cause the illumination determiner to: inactivate illumination once the user device has been positioned; and enter a sleep state for a sleep period before the method is repeated.

According to a third aspect, it is presented an illumination determiner comprising: means for determining a need for adjusting illumination; means for determining a field of view of the at least one camera of a user device also comprising a light source; means for obtaining environment data for elements within the field of view from previously stored environment data;

means for selecting at least one key element of the elements; and means for adjusting illumination of at least a subset of the at least one key element by adapting a light source.

According to a fourth aspect, it is presented a computer program for illuminating an environment for localisation of a user device comprising a light source and at least one camera. The computer program comprises computer program code which, when run on a illumination determiner causes the illumination determiner to: determine a need for adjusting illumination; determine a field of view of the at least one camera of the user device; obtain environment data for elements within the field of view from previously stored environment data; select at least one key element of the elements; and adjust illumination of at least a subset of the at least one key element by adapting a light source.

According to a fifth aspect, it is presented a computer program product comprising a computer program according to the fourth aspect and a computer readable means on which the computer program is stored.

Whenever the term 'simultaneous localisation and mapping' (SLAM) is used herein, it is to be interpreted as the construction and/or updating of a map of an environment while determining the position of a user device within the environment. It is to be noted that the invention is not limited to the use of SLAM and can be used with any suitable locating algorithm which is based on image capturing.

Whenever the term 'field of view' is used herein, it is to be interpreted as the visible field of e.g. a camera or a user. The field of view can be defined e.g. by the aperture of a camera or the angles that are visible by an eye of a user.

Whenever the term 'user device' is used herein, it is to be interpreted as a device of a user. In this application, the user device is used for localisation of itself and optionally of mapping its environment, e.g. using SLAM. The user device is portable and can e.g. be a head mounted display, a smartphone, a tablet computer, etc.

Whenever the term 'environment data' is used herein, it is to be interpreted as data of a model describing elements of an environment in a two or three dimensional space. The environment data can be in the form of at least one pixel, a region or a complete image, or at least one voxel, or a region or a complete point cloud or polygon mesh.

Whenever the term 'element' is used herein, it is to be interpreted as part of or a whole object that can be used for localisation and optionally for mapping.

Whenever the term 'key element' is used herein, it is to be interpreted as an element being important for localisation to function.

Whenever the term 'light source' is used herein, it is to be interpreted as any device that is capable of emitting light. The light can be within a visible range or in an infrared range.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein relate to illumination for localisation of a user device, where the localisation is based on at least one camera of the user device. The method is based on identification and selection of key elements in the environment. A light source is adjusted to achieve appropriate illumination of the key elements to enable localisation.

Figure 1:
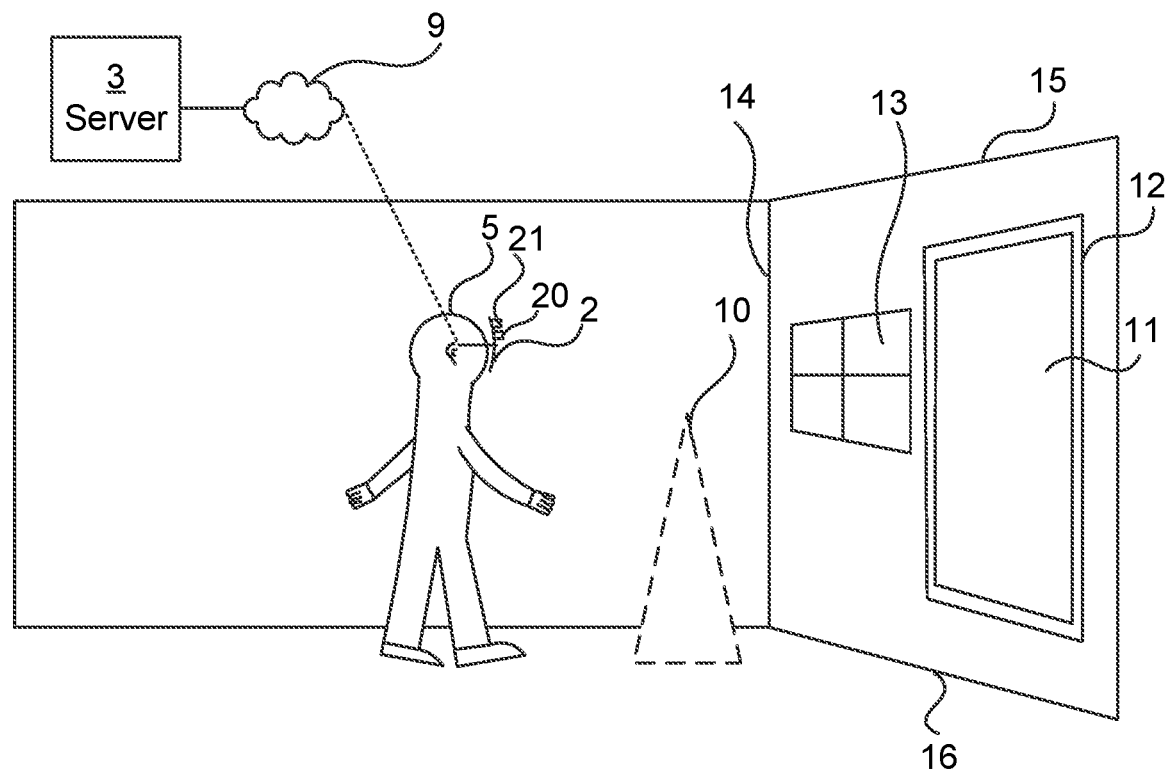
FIG. 1 is a schematic diagram illustrating an environment in which embodiments presented herein can be applied.

FIG. 1 is a schematic diagram illustrating an environment in which embodiments presented herein can be applied. The environment shown in FIG. 1 is used for AR, where a user 5 wears a user device 2, such as a head mounted display (HMD), which allows the user 5 to see both real-world objects 11-16 and a virtual object 10. The user device 2 contains sensors (e.g. accelerometers, gyros, etc.) e.g. as part of an inertia measurement unit (IMU) which can form part of data used to determine the position and orientation of the user device 2 in a three dimensional space.

The user device 2 comprises one or more cameras 20 for capturing images of the environment around the user 5. Each camera 20 can be in the visible light range (also known as RGB, red green blue) and/or the infrared range. It is to be noted that the cameras do not need to be directed in a direction which is visible for the user, especially when used for localisation, as described in more detail below.

The user device 2 further comprises one or more light sources 21. Each light source can be in the visible light range and/or the infrared range. Optionally, one or more of the light sources 21 can be controlled to alter a direction of illumination. The light source can be controlled to change its intensity, using either an on/off control or a gradual (dimming or brightening) control. Each light source may comprise any one or more of an array of light emitting diodes (LEDs), an array of lasers, or a vertical cavity surface emitting laser (VCSEL) array. The light source may comprise optics that are placed posterior to the light emitter, comprising one of a micro-electro-mechanical (MEMs) scanning mirror, a liquid crystal (LC) optic, or a Switchable Bragg Grating (SBG). The light source may comprise several such units, placed around the user device, to shine light horizontally (e.g., front, back, sides), and/or vertically (e.g., ceiling, floor).

The user device 2 is connected to a network 9. The network 9 can e.g. be a local area network (LAN) and/or a wide area network (WAN) such as the Internet. A server 3 is also connected to the network 9.

Around the user, there are several visual elements such as a door 11, a doorframe 12 and a window 13. Moreover, there are visual elements such as a corner 14 between walls, a ceiling line 15 and a floor line 16.

Environment data (two-dimensional or three-dimensional) is obtained from storage of the user device 2 and/or the server 3. Key elements are identified in the images and compared with the environment data to allow the user device to be positioned within the environment, optionally also using data from the IMU. The key elements can be any subset (or all) of the visual elements 11-16. It is to be noted that the visual elements vary depending on where the user 5 is located. Mapping can also occur simultaneously, whereby the environment data is updated. A process of learning an area while keeping track of a current position and orientation of a user within the area is known as Simultaneous Localisation and Mapping, or SLAM. While we sometimes refer to SLAM in the examples herein, the embodiments presented herein can be used with any current or future localisation procedure which is based on image capturing.

Once the position of the user device is derived, this can be used for further processing. For instance, a virtual object 10 can be rendered by the user device 2 for AR purposes. The virtual object 10 does not exist in reality but is computer rendered. The virtual object has a position that corresponds to a real-world position, whereby the user device 2 should be positioned prior to the virtual object 10 being rendered.

The user device 2 can e.g. be implemented using an HMD such as the Microsoft Hololens, or ODG R7/R8/R9. The HMD may also be an or Oculus Rift or HTC Vive for VR applications. It is also possible that the user device 2 is implemented using a smartphone and/or a tablet computer. It is to be noted that the term 'computer' used herein is to be interpreted as any electronic device with digital processing capabilities, regardless of size. Hence, the term computer comprises devices such as servers, desktop computers, laptop computers, tablet computers, smart phones, mobile phones, smart watches, etc.

The locating of the user device 2 based on key elements depends on there being an appropriate amount of light. According to embodiments presented herein, illumination is concentrated to key elements. This achieves a more efficient energy usage while ensuring the locating can be performed satisfactorily.

It is to be noted that the environment of FIG. 1 is only one example of where the illumination for locating presented herein can be applied. Embodiments presented herein can equally well be applied in other environments such as for self-driving vehicles, industrial applications, indoor robotics, etc.

Figure 2A:
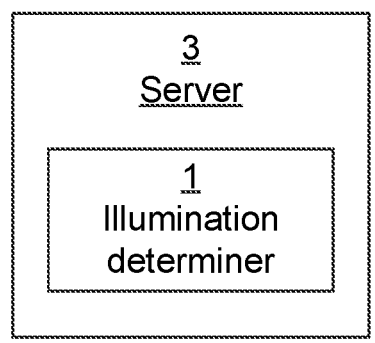
FIGS. 2A-B are schematic diagrams illustrating embodiments of where an illumination determiner can be implemented.
Figure 2B:
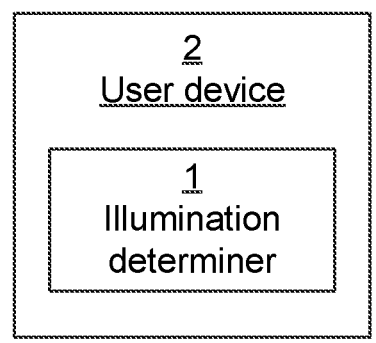

FIGS. 2A-B are schematic diagrams illustrating embodiments of where an illumination determiner can be implemented. The illumination determiner is a device that determines whether illumination needs to be adjusted for localisation of the user device, where the localisation relies on at least one camera. The illumination determiner can be implemented as a stand-alone device or it can form part of a host device, as shown in FIGS. 2A-B.

In FIG. 2A, the illumination determiner is shown as implemented in the server 3. The server is thus the host device for the illumination determiner.

In FIG. 2B, the illumination determiner is shown as implemented in the user device 2. The user device is thus the host device for the illumination determiner.

Figure 3A:
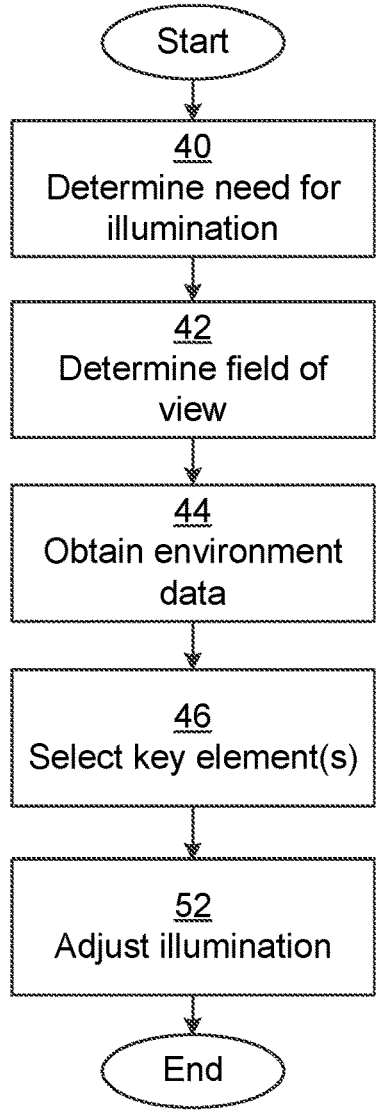
FIGS. 3A-B are flow charts illustrating embodiments of methods for illuminating an environment using a user device comprising a light source and at least one camera.
Figure 3B:
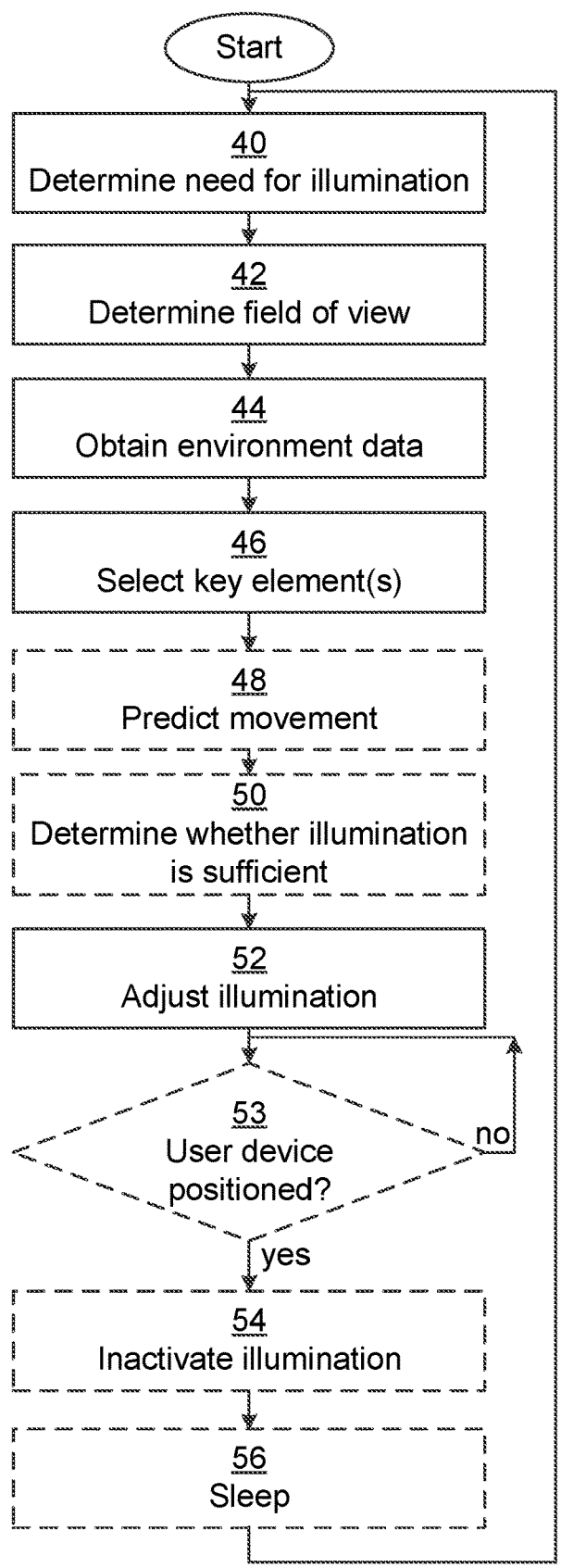

FIGS. 3A-B are flow charts illustrating embodiments of methods for illuminating an environment using a user device comprising a light source and at least one camera. In the following, a conditional step is a step where the method forks in two different possible paths. An optional step is a step that may, but does not need to, be performed. The method is performed in an illumination determiner. First, embodiments of methods illustrated by FIG. 3A will be described.

In a determine need for illumination step 40, a need for adjusting illumination is determined.

This need can be determined using one or more ambient light sensors. For instance, if the ambient light is lower than a threshold, this can be a trigger that there is a need for illumination adjustment.

Moreover, light conditions can be inferred via the analysis of an image captured by the user device. This implies that the light conditions are extracted from an image of the environment taken from one of the cameras of the user device. If the light conditions are determined to be lower than a threshold, this can be a trigger that there is a need for adjustment of the illumination.

Optionally, the need for adjustment of illumination is also based on data relating to illumination from a light source of another user device.

In one embodiment, the need for adjustment of illumination is determined based on receiving a signal, from another user device, indicating a required change of light situation in the field of view (of the camera).

In one embodiment, the need for adjustment of illumination is determined by an element detection algorithm based on images captured by the user device. Such an algorithm may be unable to find sufficient elements to successfully perform the localisation, whereby additional illumination might be required.

In one embodiment, the element detection algorithm may report a low confidence on the element matching, which, when combined with a low light reading, triggers the need for additional light.

In another embodiment, when analysing the elements acquired by the camera, it is detected that the current light intensity of a set of elements does not match an illumination index of the stored elements, and that the mismatch is larger than a threshold value. When such a mismatch occurs, the localisation is computed in a less efficient manner and will potentially fail. Hence, in order to avoid this, a need for adjustment of illumination is determined. The threshold value may be dynamically defined, based on previous analysis of the performance of the localisation algorithm.

In a determine field of view step 42, the illumination determiner determines a field of view of the at least one camera of the user device.

This determination can be based on a pose of the at least one camera of the user device.

In one embodiment, the user pose (six DoF) is measured via a SLAM localisation algorithm. When light conditions are too low, a best estimate is used to estimate the user pose, which may be mainly based on non-visual sensors such as IMU data or data from other sensors such as range sensors, radio based inputs, etc.

In one embodiment, the user pose is estimated by an external device or system, and transmitted to the device via a communication link.

In one embodiment, the current camera field of view is estimated by the user pose and the aperture angle of the camera.

In an obtain environment data step 44, the illumination determiner obtains environment data for elements within the field of view from previously stored environment data. The environment data can be in three dimensions (3D) or in two dimensions (2D). The environment data contains elements which can be matched against images captured by the user device to thereby determine a location of the user device. Each element in the environment data comprises a set of co-ordinates (2D or 3D) and optionally an illumination index. The illumination index indicates at what illumination the image of the element was captured to form part of the environment data.

The environment can be represented in the form of 2D or 3D data (e.g. an image or collection of pixels, a point cloud or mesh). The environment can be built by the SLAM algorithm based on primarily vision based sensors, but also other sensors such as range sensors. The environment data is stored and used to perform localisation and tracking of the user. The environment data may be built using inputs from one or multiple users which are currently in the environment or that have previously been in the environment.

In one embodiment, environment data corresponding to the camera field of view is obtained from memory of the user device.

In one embodiment, environment data corresponding to the camera field of view is requested from a server.

In one embodiment, the light source illuminates the environment during a short period so that the SLAM algorithm can be performed to build the environment data. Relevant elements are then stored as part of the environment data.

In a select key element(s) step 46, the illumination determiner selects at least one key element of the elements of the environment data. The key elements can be of greater importance for simultaneous localisation and mapping, SLAM, than non-key elements. In one embodiment, the elements are ranked according to importance for SLAM and a number of the highest ranked elements are selected as key elements. This number can be predefined or dynamically determined. The set of key element(s) is a strict subset of the elements of the environment data within the field of view of the camera(s). In this way, when illuminated (see step 52 below), power is saved compared to illuminating all elements within the field of view.

SLAM algorithms are based on identifying key elements to both map the environment and track the user. Such key elements can e.g. be elements such as edges/corners of objects/environment, or they may be automatically identified using element detection algorithms such as SURF (Speeded Up Robust Features) or FAST (Features from Accelerated Segment Test), or they may be complete 2D or 3D models of objects. When the key elements are identified, their position in the map is also obtained and stored as part of environment data. Prior knowledge of these elements, e.g. as a 2D or 3D model of an object, greatly improves the computational efficiency of the algorithm.

In one embodiment, the key elements are identified from the environment model of the current field of view. Key elements may be markers, edges, corners, geometric shapes, or others, which are identified via an element detection algorithm and used by the SLAM localisation and mapping algorithm. After identified, the key elements are stored in memory (of the illumination determiner).

In one embodiment, the key elements may be obtained from the memory of the device, as key elements that have been previously identified.

In one embodiment, the key element identification on the map is performed offline on a server since the server is typically not battery based, can provide more computational power and a holistic view of the environment, receiving information from many users and/or external sensors. These key elements are then transmitted to the user device.

In one embodiment, the illumination determiner determines that the user is about to arrive to a low/no light zone (see step 40), allowing the selection of key elements to be identified and selected before the user reaches the low light zone. By pre-identifying and selecting, a gradual increase of light can be performed in an adjust illumination step 52, as described below, thereby improving the user experience.

In one embodiment, the illumination index of the stored key elements is compared to the illumination of the key elements currently in the camera field of view. If the mismatch between the key elements is larger than a threshold, those key elements are selected to be illuminated.

In one embodiment, only a set of the mismatched key elements is selected, where the selected set depends on the current computational and energy resources, or the set is selected based on the least number of elements required for the SLAM localisation and mapping algorithm to be performed with a performance level larger than a specific threshold. The performance of the algorithm can e.g. be related to the accuracy of the localisation or mapping, and/or the time the localisation or mapping takes. For instance, the performance can be measured using any one or more of robustness, convergence speed, and accuracy.

In one embodiment, a rank based on the element mismatch is computed and used in the key element selection. Optionally, the rank can be calculated based on a distance between the user device and the respective element.

In one embodiment, a rank is calculated based on the relevance of each key element to the SLAM algorithm as well as the mismatch level. A set of elements is then selected according to the rank.

To determine the relevance of element and illumination mismatch on the SLAM algorithm, the output of the SLAM algorithm when performed on the previously acquired elements can be analysed. Another approach is to model the input/output behaviour of the SLAM algorithm and use this model to infer the rank.

The key elements can be regions with strong contrast, edges with high order of geometrical information, or complete well defined objects. In one embodiment, key elements can be identified based on SLAM posterior covariance sensibility. This procedure recursively selects those elements that will make the SLAM converge faster. The determinant of the SLAM covariance matrix is used as a measurement of the volume of an uncertainty ellipse associated with the SLAM system state. Restricting the EKF (Extended Kalman Filter) correction stage to the selected elements allows for real and constant time implementation without losing map consistency. The extracted elements may correspond to lines and corners, either concave or convex.

This procedure can be used to derive a rank of elements within the camera field of view. Alternatively, a rank of elements within the field of view can be derived based on characteristics, such as contrast, order of geometric information of edges or lines, set of defined objects, where the priority would be to illuminate complete objects, followed by the edges and lines with the highest contrast and highest geometric information in a decreasing order of priority.

In one embodiment, systems theory is used to develop an element ranking criterion for selecting the elements which provide good conditioning for SLAM. The element subset is selected by ranking elements according to their contribution to system observability (higher system observability means better conditioned estimation).

In one embodiment, the key element selection considers what parts of the environment data the light source can project light on.

In one embodiment, if a map is available as part of the environment data, the key element selection considers what parts of the environment model are within the field of view of the camera, since environment occlusion may occur, by, e.g. other users being currently in the environment, blocking the camera view. Hence, in such embodiment, the key element selection considers the pose of other users in the scene to select the valid environment model for performing the key element selection.

In one embodiment, the number of key elements that are selected depends on the amount of battery power available for processing and light projection, since the more key elements to be processed and illuminated, the more processing is needed, which consumes more battery power.

In one embodiment, the key element selection considers the locations other users are projecting and/or will project light, selecting only the elements which are still required to be projected light on and rejecting elements which are already and/or will be projected with light.

In one embodiment, if heterogeneous cameras (e.g., RGB, infrared, near infrared) and heterogeneous light sources are available, the key elements are selected with respect to the camera and light source pair characteristics. An example may be that a certain environment area cannot provide any key element using the RGB camera as, e.g., a picture taken of a box where the colour of the box and its surrounding is the same. However, using a near infrared camera, the box edges may be able to be distinguished. In such embodiment, the key element is output together with the index of which camera/light to use to illuminate the scene.

In one embodiment, key elements are selected only outside the current focus region of the user, where the focus region is measured via eye tracking in order to not distract the user and provide an improved user experience.

In an adjust illumination step 52, the illumination determiner adjusts illumination of at least a subset of the at least one key element by adapting a light source. For instance, this can comprise turning on the light source. The illumination refrains from illuminating at least one other element which is not considered a key element, thus saving energy.

In one embodiment, the adjusting of illumination comprises matching (within a specific range) the illumination with an illumination applied for the stored data of the at least a subset of the at least one key element, as indicated by the illumination index in the environment data.

Optionally, the adjusting of illumination comprises gradually adjusting intensity of the light source. This gradual adjustment can continue until the desired illumination index of the key element is reached, or that the key element achieves a level of mismatch lower than a threshold value, or a desired SLAM performance is reached. This illumination can then be then maintained until light changes of the elements occur.

In one embodiment, the light is adjusted to match (within a margin of error) an illumination index for a key element currently within the field of view with a stored illumination of the key element in the environment data. In this way, key elements can be matched efficiently to the stored environment data, which makes the SLAM algorithm more computationally efficient, as well as increases accuracy and robustness.

In one embodiment, the light of the key element in the environment data light is adjusted in order to match and simulate the light conditions in the current environment. For instance, light can be artificially added to (or removed from) the key element of the environment data in order to compute what intensity each element should be illuminated to maximize the SLAM performance algorithm (improve robustness, convergence speed, accuracy, etc.) while reducing the power consumption due to the use of the light sources. Based on such closed-loop simulation, the light source is then actuated to match the result achieved from the simulation. As the simulation result is might not be the same as the real case, the light can be further adjusted to achieve the desired illumination index at the key element.

When the light source can be controlled directionally, the adjusting illumination can comprise directing the light source in a certain direction to obtain desired illumination characteristics of one or more key elements. In other words, the light source can be controlled to project light with desired intensity at the selected key elements. Optionally, the light is directed to locations outside the field of view of the user (e.g. outside of where the user has his/her focus) and where the user is currently viewing virtual objects in order to not degrade the user experience, since illuminating real-world objects in the direction where there are virtual objects may disturb how the virtual objects are experienced. This may be performed by, mechanically or optically, orienting each light source to the particular key element. The light source may stay fixed on each key element or the light source may be actuated to shine on each key element in a progressive manner (round robin according to the key element rank). In one embodiment, the light source optics (e.g. a mirror, or a disk with holes placed in front of the light source) may be actuated so that the light source is oriented to the particular key element. In another example, a dynamical adjustment of an aperture cone of the light source may be performed.

In one embodiment, if more than one fixed light source is available, only a set of light sources may be turned on, to illuminate the key elements. The intensity of the light can be set to a desired intensity.

In the situation that no key elements can be identified due to an inability to estimate user pose or that there is no environment data available, a complete illumination of the scene can be performed initially. Soon after, once the environment model is identified and a rough user pose estimation can be performed, the method described here can be performed to illuminate only key element(s).

Once the illumination is performed, the user device can position itself, e.g. using SLAM.

Using embodiments presented herein, key elements of an environment where a light source should project its light are selected. By illuminating only key elements, energy and heat spent on the illumination process is reduced, compared to illuminating the whole scene. The user experience is also less degraded than if one illuminates the complete scene.

Looking now to FIG. 3B, only new or modified steps compared to the steps of FIG. 3A will be described.

In an optional predict movement step 48, the illumination determiner predicts movement of at least one of the user device and a key element. The adjust illumination step 52 can then adjust illumination based on the predicted movement.

When this step comprises predicting movement of the user device to a location where light conditions are different from current light conditions, the adjust illumination step 52 can comprise gradually adjusting intensity of the light source to thereby improve user experience.

In one embodiment, the key element location is estimated based on the current user movement dynamics and the object dynamics (if the object containing the key element is a dynamic object) and the time it takes for the light source to be adjusted.

In an optional determine whether illumination is sufficient step 50, the illumination determiner determines, for each key element, whether a level of illumination of a key element needs to be adjusted. If this is the case, the adjust illumination step 52 comprises only adjusting the illumination for any key element for which illumination needs to be adjusted. Illumination for other key elements is left unchanged.

In an optional conditional user device positioned step 53, the illumination determiner evaluates whether the user device has been positioned (i.e. located), e.g. using SLAM. If this is the case, the method proceeds to an optional inactivate illumination step 54. Otherwise, the method repeats this step, after an optional delay (not shown).

In an optional inactivate illumination step 54, the illumination determiner inactivates illumination. This can be done since at this stage, the user device has been positioned and the need for illumination is reduced, at least momentarily.

In an optional sleep step 56, the illumination determiner enters a sleep state for a sleep period before the method is repeated. This implies that the illumination determiner is not active when in the sleep state. However, this does not require any inactivity for the host device (e.g. the user device or the server). When the illumination determiner is in the sleep state, the user device can be located using IMUs. When IMU positioning is at risk of becoming inaccurate, the sleep state is exited. The illumination determiner is then in an active state and the method is performed once again.

Here now follows a few scenarios illustrating how embodiments presented herein can be applied.

In one scenario, a user is in a dark room and wants to run an AR application, such as playing an AR game or watching a movie on a virtual large screen. This would require mapping the room, which would not be possible due to the darkness. In the prior art, all light sources are turned on, which would limit the experience by not only reducing the contrast of the AR display, but also reducing the movie experience. On the other hand, using embodiments presented herein, only key elements need to be illuminated, which uses less energy and reduces user disturbance.

In another scenario, a low light condition is detected. Based on the environment data and estimation of user and camera pose, the key elements of the model which can receive a light are selected. By focusing on enhancing illumination of key elements, embodiments presented herein provide an optimised scene to be captured by the cameras and processed by the SLAM algorithm. Moreover, the embodiments presented herein provides a more energy efficient solution since the illumination is focused to specific regions instead of a complete region. The light adjustment is performed so that the light intensity of said key elements matches the illumination index of the key element in the environment data or that the key element mismatch between the stored data and the currently captured key element is lower than a certain level. This may reduce the required light from a maximum, further reducing energy usage and user disturbance.

In another embodiment, a display device is to display a virtual object in the same location as a real-world object currently observed in the environment and a low light condition is detected. The real-world object was previously captured and stored as a key element. Due do the low light conditions, a matching between the real-world object currently viewed and the one previously stored cannot be performed. By focusing on enhancing illumination of said real-world object, embodiments presented herein provide an optimised illumination of the real object which allows the matching between the currently viewed real-world object and the previously stored real-world object to be achieved. After a matching is achieved, the light source is reduced to a minimum in order to not disturb the user experience.

Figure 4:
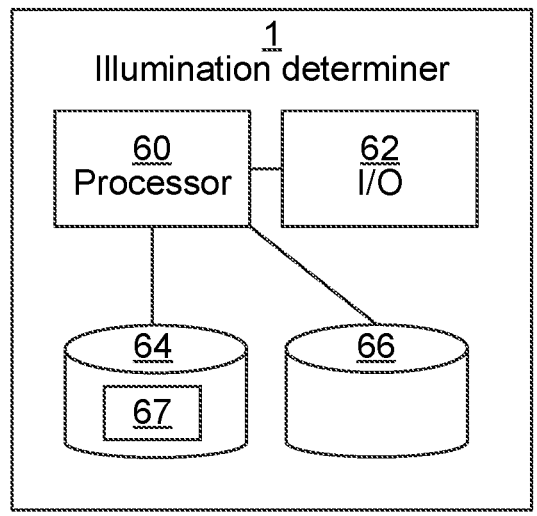
FIG. 4 is a schematic diagram illustrating components of any one of the illumination determiner of FIGS. 2A-B according to one embodiment.

FIG. 4 is a schematic diagram illustrating components of the illumination determiner 1 of FIGS. 2A-B. It is to be noted that any one or more of the components described here can optionally be shared with a host device, such as a server (3 of FIG. 2A) or a user device (2 of FIG. 2B). A processor 60 is provided using any combination of one or more of a suitable central processing unit (CPU), multiprocessor, microcontroller, digital signal processor (DSP), application specific integrated circuit etc., capable of executing software instructions 67 stored in a memory 64, which can thus be a computer program product. The processor 60 can be configured to execute the method described with reference to FIGS. 3A-B above.

The memory 64 can be any combination of random access memory (RAM) and read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of random access memory (RAM) and read only memory (ROM).

The illumination determiner ifurther comprises an I/O interface 62 for communicating with other external entities. Optionally, the I/O interface 62 also includes a user interface.

Other components of the illumination determiner 1 are omitted in order not to obscure the concepts presented herein.

Figure 5:
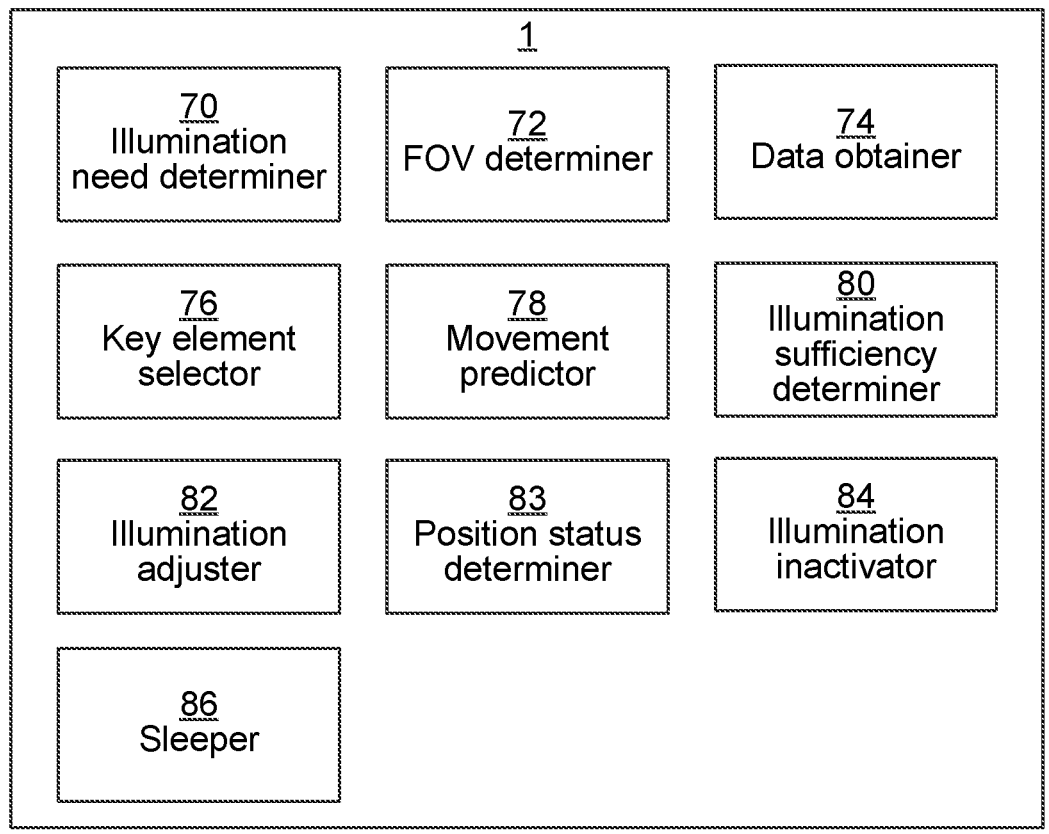
FIG. 5 is a schematic diagram showing functional modules of the illumination determiner of FIGS. 2A-B.

FIG. 5 is a schematic diagram showing functional modules of the illumination determiner 1 of FIGS. 2A-B according to one embodiment. The modules are implemented using software instructions such as a computer program executing in the illumination determiner 1. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 3A-B.

An illumination need determiner 70 corresponds to step 40 of FIGS. 3A-B. A FOV (Field of View) determiner 72 corresponds to step 42 of FIGS. 3A-B. A data obtainer 74 corresponds to step 44 of FIGS. 3A-B. A key element selector 76 corresponds to step 46 of FIGS. 3A-B. A movement predictor 78 corresponds to step 48 of FIG. 3B. An illumination sufficiency determiner 80 corresponds to step 50 of FIG. 3B. An illumination adjuster 82 corresponds to step 52 of FIGS. 3A-B. A position status determiner 83 corresponds to step 53 of FIG. 3B. An illumination inactivator 84 corresponds to step 54 of FIG. 3B. A sleeper 86 corresponds to step 56 of FIG. 3B.

Figure 6:
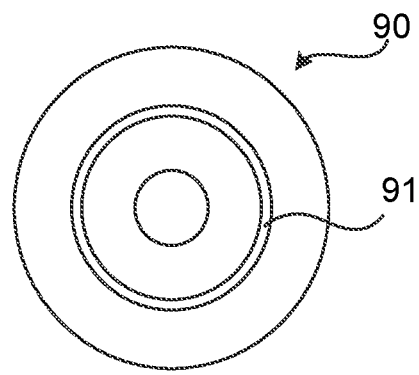
FIG. 6 shows one example of a computer program product comprising computer readable means.

FIG. 6 shows one example of a computer program product comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 67 of FIG. 4. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for illuminating an environment for localisation of a user device comprising a light source and at least one camera, the method being performed in an illumination determiner and comprising:
    determining a need for adjusting illumination;
    determining a field of view of the at least one camera of the user device;
    obtaining environment data for elements within the field of view from previously stored environment data;
    selecting at least one key element of the elements, wherein key elements are of greater importance for simultaneous localisation and mapping, SLAM, than non-key elements, and wherein selecting the at least one key element comprises ranking the elements according to importance for SLAM and selecting a number of the highest ranked elements; and adjusting illumination of at least a subset of the at least one key element by adapting a light source.

2. The method according to claim 1, wherein adjusting illumination comprises matching the illumination with an illumination applied for the stored data of the at least a subset of the at least one key element.

3. The method according to claim 1, further comprising:
determining, for each key element, whether a level of illumination of the key element needs to be adjusted;
and wherein adjusting illumination comprises only adjusting the illumination for any key element for which illumination needs to be adjusted.

4. The method according to claim 1, wherein adjusting illumination comprises directing the light source.

5. A method for illuminating an environment for localisation of a user device comprising a light source and at least one camera, the method being performed in an illumination determiner and comprising:
determining a need for adjusting illumination;
determining a field of view of the at least one camera of the user device;
obtaining environment data for elements within the field of view from previously stored environment data;
selecting at least one key element of the elements;
adjusting illumination of at least a subset of the at least one key element by adapting a light source
inactivating illumination once the user device has been positioned; and
entering a sleep state for a sleep period before the method is repeated.

6. An illumination determiner for illuminating an environment for localisation of a user device comprising a light source and at least one camera, the illumination determiner comprising:
a processor; and
a memory storing instructions that, when executed by the processor, cause the illumination determiner to:
determine a need for adjusting illumination;
determine a field of view of the at least one camera of the user device;
obtain environment data for elements within the field of view from previously stored environment data;
select at least one key element of the elements, wherein key elements are of greater importance for simultaneous localisation and mapping, SLAM, than non-key elements, and wherein selecting the at least one key element comprises ranking the elements according to importance for SLAM and selecting a number of the highest ranked elements; and
adjust illumination of at least a subset of the at least one key element by adapting a light source.

7. The illumination determiner according to claim 6, wherein the instructions to adjust illumination comprise instructions that, when executed by the processor, cause the illumination determiner to turn on the light source.

8. The illumination determiner according to claim 6, wherein the instructions to adjust illumination comprise instructions that, when executed by the processor, cause the illumination determiner to match the illumination with an illumination applied for the stored data of the at least a subset of the at least one key element.

9. The illumination determiner according to claim 6, wherein the instructions to determine a need for light source adaptation comprise instructions that, when executed by the processor, cause the illumination determiner to consider illumination from a light source of another user device.

10. The illumination determiner according to claim 6, wherein the instructions to determine a need for light source adaptation comprise instructions that, when executed by the processor, cause the illumination determiner to determine a need for light source adaptation based on receiving a signal, from another user device, indicating a required change of light situation in the field of view.

11. The illumination determiner according to claim 6, wherein the instructions to determine a field of view comprise instructions that, when executed by the processor, cause the illumination determiner to determine a field of view based on a pose of the at least one camera of the user device.

12. The illumination determiner according to claim 6, wherein the instructions to adjust illumination comprise instructions that, when executed by the processor, cause the illumination determiner to direct the light source.

13. The illumination determiner according to claim 6, further comprising instructions that, when executed by the processor, cause the illumination determiner to:
inactivate illumination once the user device has been positioned; and
enter a sleep state for a sleep period before the method is repeated.

14. An illumination determiner for illuminating an environment for localisation of a user device comprising a light source and at least one camera, the illumination determiner comprising:
a processor; and
a memory storing instructions that, when executed by the processor, cause the illumination determiner to:
determine a need for adjusting illumination;
determine a field of view of the at least one camera of the user device;
obtain environment data for elements within the field of view from previously stored environment data;
select at least one key element of the elements;
predict movement of at least one of the user device and a key element to a location where light conditions are different from current light conditions; and
adjust illumination of at least a subset of the at least one key element by adapting a light source to gradually adjust intensity of the light source.

15. An illumination determiner:
a processor; and
a memory storing instructions that, when executed by the processor, cause the illumination determiner to:
determine a need for adjusting illumination;
determine a field of view of the at least one camera of the user device;
obtain environment data for elements within the field of view from previously stored environment data;
select at least one key element of the elements;
determine, for each key element, whether a level of illumination of the key element needs to be adjusted; and
adjust illumination of at least a subset of the at least one key element by adapting a light source to only adjust the illumination for any key element for which illumination needs to be adjusted.

16. A computer program product comprising computer readable means including a computer program stored thereon, wherein the computer program being provided to illuminate an environment for localisation of a user device comprising a light source and at least one camera, the computer program comprising computer program code which, when run on a illumination determiner causes the illumination determiner to:
- determine a need for adjusting illumination;
- determine a field of view of the at least one camera of the user device;
- obtain environment data for elements within the field of view from previously stored environment data;
- select at least one key element of the elements, wherein key elements are of greater importance for simultaneous localisation and mapping, SLAM, than non-key elements, and wherein selecting the at least one key element comprises ranking the elements according to importance for SLAM and selecting a number of the highest ranked elements; and
- adjust illumination of at least a subset of the at least one key element by adapting a light source.

* * * * *